June 20, 1950           J. MÜLLER           2,512,365
FILTER FOR THE CLARIFICATION OF OILS
Filed Sept. 26, 1947           3 Sheets—Sheet 1
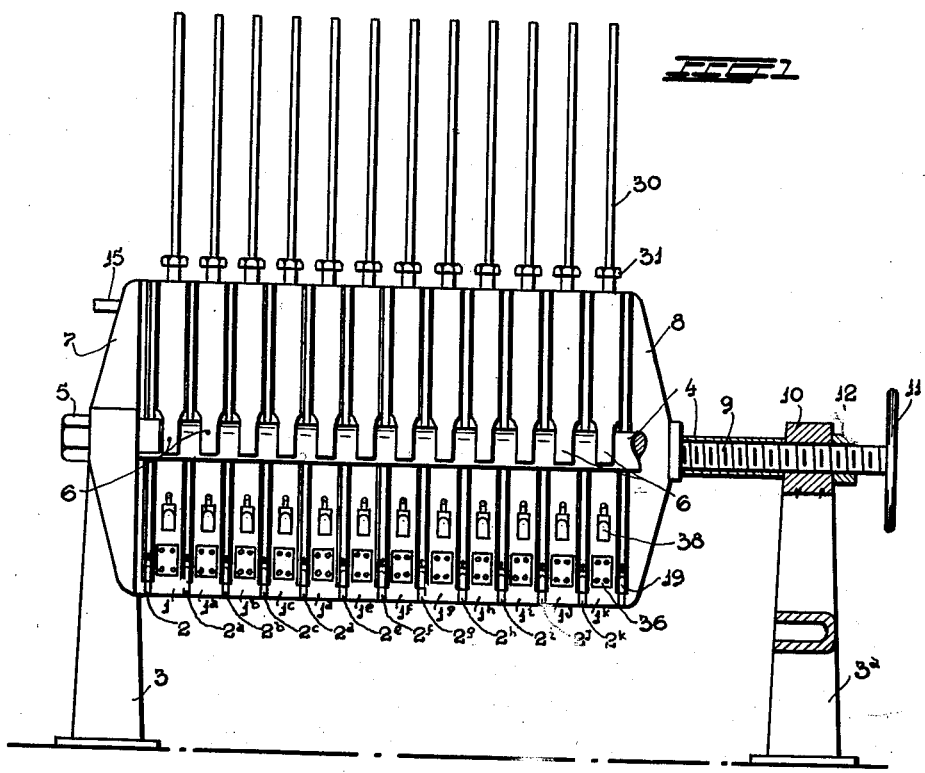
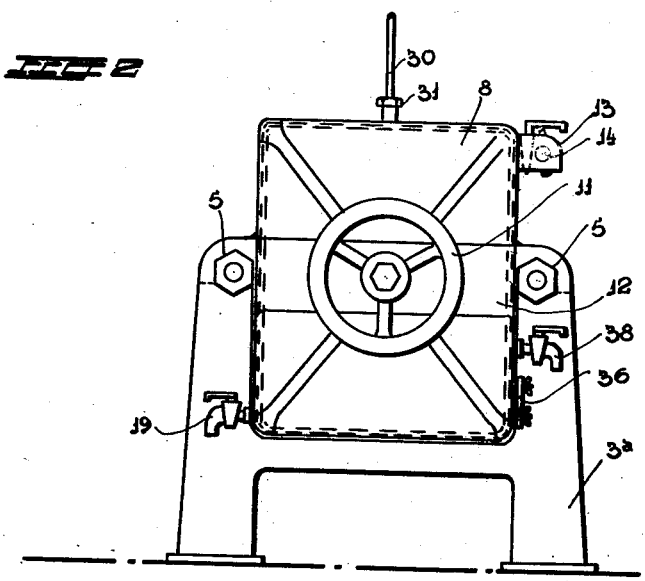
Inventor
Juan Müller
By E.D. Freeman
Attorney.

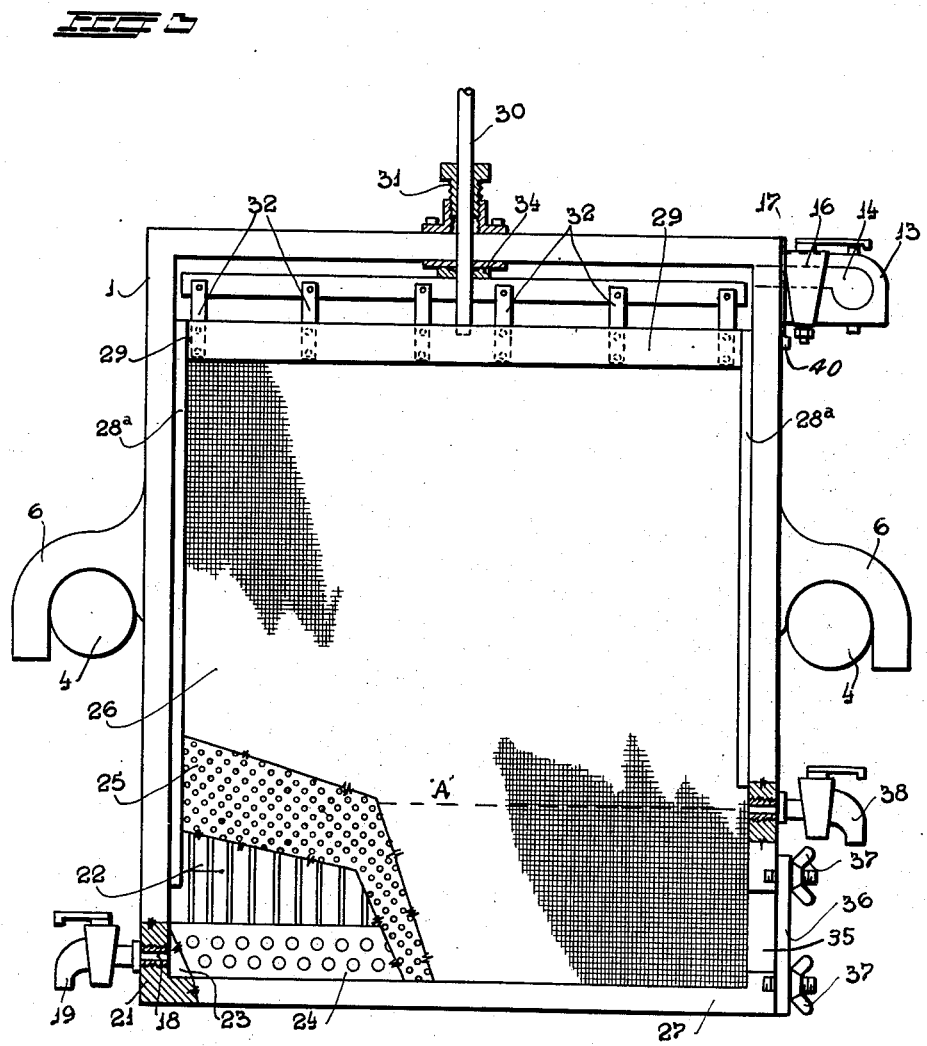

June 20, 1950  J. MÜLLER  2,512,365
FILTER FOR THE CLARIFICATION OF OILS
Filed Sept. 26, 1947  3 Sheets-Sheet 3
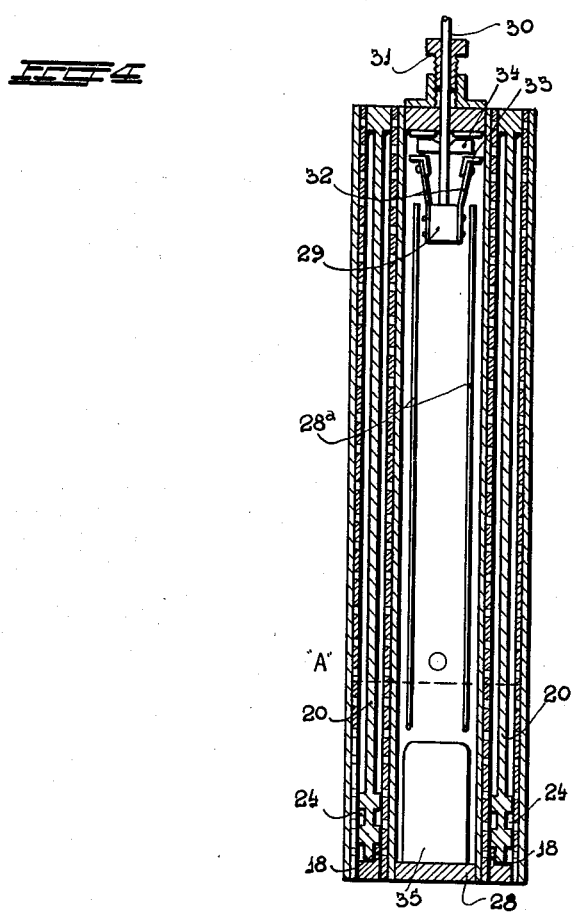
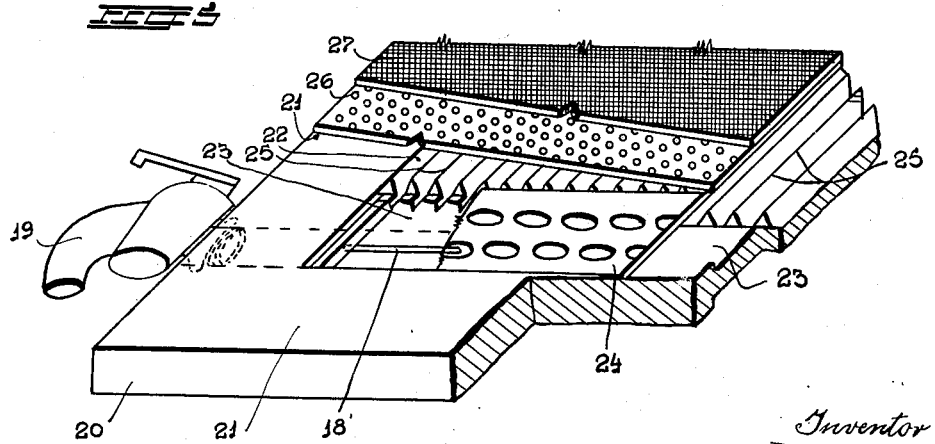
Inventor
Juan Müller
By E. J. Freeman
Attorney Patented June 20, 1950

2,512,365

UNITED STATES PATENT OFFICE 2,512,365

FILTER FOR THE CLARIFICATION OF OILS

Juan Müller, Buenos Aires, Argentina

Application September 26, 1947, Serial No. 776,286

5 Claims. (Cl. 210—182)

The present invention relates to filters in general for fluids, and more particularly to filters for the clarification of oils, intended to continuously operate, and has for its object a novel structural system which permits of keeping at all times the filtering members in a clean condition, in order to insure an uninterrupted flow of the material to be filtered and thus keep the passing capacity of the filtering members at its maximum over large periods.

A further purpose of the invention consists in providing means permitting of accumulating the materials the nature or condition whereof prevents their passage through the filtering members, within special spaces whence such materials may be discharged intermittently.

Another of the objects of the invention is to subdivide the filter into a plurality of units easy to insert and to take out with regard to the general assembly, making possible the exchange of any of the units for its general cleansing or repair.

A further object of the invention consists in permitting of independently effecting the cleaning of any of the units into which the filter is divided.

Another object of the invention is to permit independently, and without interfering with the continuous function of the remaining portion of the device, of dismantling any of the units.

Further objects of the invention as well as the advantages derived therefrom will become apparent in the course of the present specification describing, by way of example merely, an embodiment thereof with reference to the accompanying drawings, in which:

Figure 1 is an elevation, with partial section, of a filter made in accordance with the invention;

Figure 2 is an end view of the filter shown in Figure 1;

Figure 3 is a transverse section through one of the charging and cleaning units of the filter, taken on a central plane in a direction parallel to the general extension thereof;

Figure 4 is a transverse section through one of the filtering units closely packed by the side of one of the charging and cleaning units, taken through a central plane at right angles to the sectional plane of Figure 3;

Figure 5 is a fragmentary view of a detail of the filtering members, forming an integral part of the filter.

In accordance with the invention, the filter forming the object thereof is constituted (see particularly Figure 1) of a plurality of charging and cleaning units 1, 1a, 1b, 1c, 1d, 1e, 1f, 1g, 1h, 1i, 1j, 1k, etc. juxtaposed in alternating relation with filtering units 2, 2a, 2b, 2c, 2d, 2e, 2f, 2g, 2h, 2i, 2j, and 2k. The units 1, 1a, 1b, etc., are lined up on a frame constituted by a pair of uprights 3, 3a, set up facing each other in spaced relation and connected by two parallel bars 4, 4 each of which is secured to one side of each of the two uprights 3, 3a, by means of locknuts 5. The pair of parallel bars 4, 4, extend in a substantially horizontal plane and between both bars the charging and cleaning units 1, 1a, 1b, etc. are suspended by means of hooks 6, 6 provided at both sides of each unit. Between the charging and cleaning units 1, 1a, 1b, etc. are arranged as stated above, in alternating relation, the filtering units proper 2, 2a, 2b, etc. The pile of charging and cleaning units 1, 1a, 1b, etc. and of filtering units 2, 2a, 2b, etc. finishes at either end by a pair of caps 7 and 8. The cap 7 may be integral with the upright 3 as shown in Figure 1, where as the cap 8 is movable and takes up the axial thrust of a screw spindle 9 screwed through the correspondingly threaded perforation of a cross-beam 10 of the upright 3a, and provided with a hand-wheel 11 and a locknut 12 for locking the spindle 9 in the desired position. The caps 7, 8 constitute endwise closures for the pile or stack of units, both charging and cleaning, and filtering units, which are fitted against each other by sealing contact between their juxtaposed faces, or by means of projecting portions and recesses to form a groove-and-tongue joint, or by means of gaskets, as may be deemed most convenient for the purpose of tightly sealing the joints, assisted by the pressure exerted by the screw 4, in order to prevent as absolutely as possible any leakages of fluid through the joints.

Each of the charging and cleaning units 1, 1a, 1b, etc. is provided near its upper end at one side, in the embodiment shown, with a connecting lug 13 having a transversal bore 14 for the insertion of a feeding means for the fluid to be filtered, for instance, a pipe 15 provided with lateral perforations (of which only the outer end for connection to the supply, see Figure 1, is shown) and passing through the lugs 13 of each and all of the units 1, 1a, 1b, etc., being connected with the interior of the latter by means of adequate perforations acting as taps for the body of fluid led through said pipe, or by short lengths of intermediate pipes, either rigid or flexible. Inasmuch as the individual connection of the units to the fluid feeding means may be effected in different ways known in the art I do not believe it necessary to enter into further detail with regard thereto.

Each lug 13 includes a closure means such as a valve or cock the plug whereof is designated by the reference 16 and which permits of connecting the feeding pipe 15 with the interior of the unit or shutting the unit off the feed at will. To dismantle any of the units from the assembly of the stack or pile, to insert such unit anew or to replace it by another one of similar structure, each lug 13 with its corresponding cock is secured to the unit by means of a flange 17 fastened by bolts 40 (see Figure 3). This arrangement, together with that of a flexible, telescoping or removable connection between the lug 13 and the feeding pipe 15, has the additional advantage to permit of removal of any of the intermediate units 1, 1a, 1b, etc. and of pressing the remaining charging and cleaning units and filtering units close together by tightening to this effect the screw 9 in such manner as to shorten the stack of units correspondingly, whereby the working of the filter may be continued without the unit or units which have been dismounted therefrom.

The fluid which has been filtered, may be drawn off through openings 18, arranged at the lower ends laterally of the filtering units 2, 2a, 2b, etc. The openings 18 are provided with a cock 19 which may be opened to draw off the fluid which has passed through the filtering units and accumulated in the bottom thereof.

Each filtering unit 2, 2a, 2b, etc. is formed as follows:

As may be particularly seen in Figure 5, the structure comprises a plate 20, preferably made of cast iron or other suitable cast metal. The plate 20 has a smooth border portion 21 surrounding the whole periphery, and forming juxtaposing surfaces with regard to a pair of adjacent units 1, 1a, 1b, etc. at both sides of the plate 20. In the area encased by the border portion 21, the plate 20 is formed with a fluted or grooved surface 22, having straight parallel grooves extending in a substantially vertical direction with regard to the assembly. At its lower portion, adjacent the smooth border portion 21, the grooved part 22 is recessed to form a chamber 23 which is covered by a sheet 24 provided with perforations of a relatively large diameter, which is inserted in said recess, its upper face resting flush with the corresponding adjacent smooth border portion 21 and also with the ridges 25 separating the grooves of the surface 22. The aforesaid openings 18 for the outlet of the filtered fluid, are bored through the border portion at the lower part of the sides thereof, as shown at 18', and threaded inwardly for screw fitting thereto the cocks 19. As may be seen from Figure 3, the opening 18 is placed above the level of the lower smooth border portion 21 of the plate 20 and its bore opening into the chamber 23 covered by the perforated sheet 24 is in communication with the flutes of the surface 22; due to this arrangement, any fluid running down the flutes of the surface 22, will be directed towards the chamber 23 and may be drawn off through the opening 18 and the cock 19 connected thereto. The plate 20 is covered in its whole extension by a sheet 26 provided with a large number of comparatively small holes uniformly distributed and said sheet 26 is in turn covered by a filtering member, such as a suitable cloth or fabric, for instance canvas, as shown at 27, for straining the fluid. This arrangement is the same on either side of the filtering unit. The fluid entering into each unit 1, 1a, 1b, etc. and filling the space thereof will bear under pressure against the entire surface of the straining cloth 27 forming part of each of the filtering units 2, 2a, 2b, etc. closely fitted against the unit in question and passes through said straining cloth 27 and the perforations of the underlying sheet 26 to the flutes of the surface 22 of the flat body 20, running along said flutes towards the space of the chamber 23, whence it may be drawn off through the cock 19. This filtering action is an exceedingly quick one due to the large surface of the straining cloth and also due to the fact that the filtering unit operates on both its sides, supplied with fluid from two adjacent charging and cleaning units 1, 1a, 1b, etc.

Each charging and cleaning unit 1, 1a, 1b, etc., is formed by a frame 28 having the same contour as the filtering units 2, 2a, 2b, etc. The frame 28 is provided at both sides with a pair of hooks 6 which rest upon the two parallel bars 4, 4, to support the frame. At its upper lateral portion said frame 28 has the previously mentioned lug secured by a flange connection 17 and bolts 18 and provided with a shut-off cock with plug 16 and connecting opening 14. Within the frame 28, both sides thereof are provided each with pairs of vertical spaced guides 28a, 28a. Between said guides a horizontal beam 29 is disposed to travel in a vertical plane. The beam 29 is secured in a substantially central position to a rod 30 vertically passing through the upper horizontal wall of the frame 28 being guided through a stuffing box 31 to insure a fluid tight joint with this movable connection. The rod 30 projects through said stuffing box in a suitable length to permit of imparting to said beam 29 a downward motion between the pairs of guides 28a, 28a, by pushing said rod 30 into the frame 28. The beam 29 carries fastened on both sides (see Figures 3 and 4) corresponding numbers of leaf springs 32 projecting upwardly, and said springs 32 carry at their upper ends a pair of angle-profile bars 33, one of these being fastened upon the row of springs 32 at one side, the other being fastened upon the row of springs 32 at the other side, the angle-profile bars being arranged in such manner to the springs by their substantially vertical flange that the other flange, projecting in a substantially horizontal direction, is made to bear under the pressure exerted by the springs 32, with their free edges, against the straining cloth 27 of the adjacent filtering unit 2, 2a, 2b, etc. A suitable abutment 34 limits the upward movement of the angle-profile bars 33 and of the assembly holding these, 29—30—32. Said angle-profile bars, upon traveling along the straining cloth 26 of the filtering unit 2, 2a, 2b, etc. pressed against each side of the charging and cleaning unit 1, 1a, 1b, etc. will scrape from said straining cloth all particles which are adhered thereto being unable to pass through the cloth 26, such as lees, solid or jelly-like substances, etc. which will be pushed by the scraper bars towards the bottom of the frame 28 beneath the level marked in a general manner by the line A. The frame 28 is provided with a lateral opening 35 for the discharge of the lees and other residue, which opening may be closed by means of a plate or blind flange 36, fastened by means of wing nuts 37, 37 against the outer wall to cover said opening 35. Normally, said opening 35 will of course be closed by the blind flange 36. Above the level A the outer wall of the frame 28 is provided with a threaded perforation in which a cock 38 is inserted. Said cock 38 permits of extracting non-filtered fluid for control purposes.

In practical use it has been proved that, for instance in the filtration of oils, the oil passing capacity of the filtering units will, during a continuous working period of four hours become reduced to about one third of its original capacity, due to the obstruction formed by the accumulation of lees and other residues upon the straining members of the filtering units. In accordance with the invention, on verifying by the telltale discharge of the cock 19 that the passing capacity of some of the filtering units is being reduced, the rods 30 of the adjacent charging and cleaning devices are pushed into same and pulled out again, this operation being repeated if necessary, by which all residue will be effectively separated from the straining cloths 26 and pushed towards the bottom of the unit 1, 1a, 1b, etc. of the frame 28 for its adequate removal through the opening 35, by taking off the blind flange 36. The proper time for removing the residues may be established by opening the cocks 38, when the fluid discharged by the latter is noted to be charged with impurities.

It will be readily understood that the structure described and disclosed in the drawings has been only chosen as a practical form of embodiment by way of example, it being possible to adopt modifications falling within the reach of the present invention, as will be apparent to those skilled in the art. Units having a different shape of any kind than those disclosed may be used, for instance, units having a round shape; the stack or pile might be disposed in a vertical position, i. e. the units will assume positions in horizontal planes. It may be also possible to arrange the coupling in total or in groups of the actuating members of the scrapers for the filtering units, such as the rods 30, as well as means operated mechanically, electrically or by fluids under pressure capable of actuating said rods or other means, and many other arrangements of details of the object of the invention within the scope of the inventive idea, such as defined by the claims annexed to the present specification, and I therefore claim as my right and exclusive property all such alterations in structure forming but simple modifications of this invention.

Having now particularly ascertained and described the nature of my said invention and the manner in which the same is to be carried into practice, I hereby declare that what I claim to be of my exclusive invention and property, is:

1. In a filter a frame structure, a plurality of vertical charging and filtering units supported by said frame structure in an adjacent pressure-contacted alternating relationship, said charging units consisting of frames encasing an inner charging space for the fluid to be filtered, means to feed said fluid into said charging space, said filter units consisting of plates, having a recessed center portion and a peripheral border portion surrounding said recessed center portion, said border portion forming a contact surface with the adjacent charging units, parallel ridges on said recessed center portion and grooves between said ridges the latter ending with their lower ends short of said border portion a fluid collecting chamber between the end of said ridges and said border portion, said fluid collecting chamber being connected with said grooves, sheets consisting of a filtering material covering the outside faces of said plates and fluid outlet means for the filtered fluid from said collecting chamber.

2. In a filter a frame structure, a plurality of vertical charging and filtering units supported by said frame structure in an adjacent pressure-contacted alternating relationship, said charging units consisting of frames encasing an inner charging case for the fluid to be filtered, means including an inlet provided lug and a supply tube provided at an outer corner portion of said frames, said filter units consisting of plates having a recessed center portion and a peripheral border portion surrounding said recessed center portion, said border portion forming a contact surface with the adjacent charging units parallel vertical ridges on said recessed center portion and grooves between said ridges the latter ending with their lower ends short of said border portion, a fluid collecting chamber between the lower ends of said ridge and said border portion said fluid collecting chamber being connected with said grooves, sheets made of a filtering material applied to the outside faces of said plates and controllable fluid outlet means for the filtered fluid from said collecting chamber, said outlet means leading through said border portion.

3. In a filter a frame structure, a plurality of vertical charging and filtering units supported by said frame structure in an adjacent pressure-contacted alternating relationship, the charging units consisting of removable frames encasing an inner charging space for the fluid to be filtered, means to feed said fluid into said charging space, said filter units consisting of plates having a recessed center portion and a peripheral border portion surrounding said recessed center portion said border portion forming a contact surface with the adjacent charging units, vertical ridges on said recessed center portion and grooves between said ridges, the latter ending with their lower ends short of said border portion, a fluid collecting chamber between the lower ends cf said ridges and said border portion said fluid collecting chamber being connected with said grooves, a perforated sheet covering said collecting chamber and lying flush with said border portion, a second perforated sheet covering said plates, sheets made of a filter material applied to the outside face of said second sheet and fluid outlet means for the filtered fluids from said collecting chamber.

4. In a filter a frame structure, a plurality of vertical charging and filtering units of substantially equal size and configuration supported by said frame structure in an adjacent pressure contacted alternating relationship, said charging units consisting of removable frames encasing an inner charging space for the fluid to be filtered, lugs fastened to said frames at an upper corner, a circular bore in said lugs, a horizontal tube in said bores for the supply of the fluid to be filtered and passages in said lugs connecting said tube with said inner charging space, outlet means at a lower corner of said charging units, said filter units consisting of plates having a recessed center portion and a smooth peripheral border portion surrounding said recess center portion, said border portion forming contact surfaces with the adjacent charging units, parallel vertical ridges on said recessed center portion and grooves between said ridges, said ridges ending with their lower ends short of said border portion, a fluid collecting chamber between the lower ends of said ridges and said border portion said fluid collecting chamber being connected with said grooves, sheets consisting of a filtering material covering the outside faces of said plates and fluid outlet means for the filtered fluid from said collecting chamber.

5. In a filter a frame structure, a plurality of vertical charging and filtering units supported by said frame structure in an adjacent pressure-contacted alternating relationship, said charging units consisting of frames encasing an inner charging space for the fluid to be filtered, means to feed said fluid into said charging space, said filter units consisting of plates having a recessed center portion and a smooth peripheral border portion surrounding said recess center portion said border portion forming a contact surface with the adjacent charging units, parallel vertical ridges on said recessed center portion and grooves between said ridges the latter ending with their lower ends short of said border portion, a fluid collecting chamber between said ridges and said border portion said chamber being connected with said grooves, sheets made of a filtering material applied to the outside faces of said plates, pairs of vertically movable scrapers in the inner space of said charging units, resilient means to hold said scrapers in operative contact with said filter sheets and fluid outlet means from said collecting chamber.

JUAN MÜLLER.

REFERENCES CITED

The following references are of record in the file of this patent:

UNITED STATES PATENTS

| Number | Name | Date |
|---|---|---|
| Re. 12,807 | Burt | June 9, 1908 |
| 856,332 | Bendix et al. | June 11, 1907 |
| 924,131 | Behrend | June 8, 1909 |
| 1,158,056 | Kelly | Oct. 26, 1915 |
| 1,164,065 | Burger | Dec. 14, 1915 |
| 1,271,425 | Buckley | July 2, 1918 |
| 2,183,368 | Meyer | Dec. 12, 1939 |
| 2,390,628 | Van Winkle | Dec. 11, 1945 |

FOREIGN PATENTS

| Number | Country | Date |
|---|---|---|
| 195,738 | Great Britain | Apr. 4, 1923 |